United States Patent
Bhatti

(10) Patent No.: US 7,185,020 B2
(45) Date of Patent: Feb. 27, 2007

(54) GENERATING ONE OR MORE BLOCK ADDRESSES BASED ON AN IDENTIFIER OF A HIERARCHICAL DATA STRUCTURE

(75) Inventor: Shahzad H. Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 10/676,220

(22) Filed: Oct. 1, 2003

(65) Prior Publication Data

US 2005/0076185 A1    Apr. 7, 2005

(51) Int. Cl.
*G06F 17/00*    (2006.01)
*G06F 7/00*    (2006.01)

(52) U.S. Cl. ........... 707/103 R; 711/170; 711/206

(58) Field of Classification Search ........... 707/205, 707/103 R, 509; 711/170, 206
See application file for complete search history.

(56) References Cited

U.S. PATENT DOCUMENTS 6,098,190 A    8/2000    Rust et al.
6,212,097 B1*  4/2001    Kihara et al. .......... 365/182.04
6,449,607 B1   9/2002    Tomita et al.
6,502,108 B1   12/2002   Day, III et al.
6,532,335 B2*  3/2003    Otomo et al. ............ 386/95
2002/0077803 A1 6/2002   Kudoh et al.

FOREIGN PATENT DOCUMENTS

EP    1 265 152    12/2002
JP    05020154    *  1/1993

OTHER PUBLICATIONS

The Norton Utilities Version 5.0 Disk Explorer, The Peter Norton Computing, Inc., 1990, pp. 28-54.*

* cited by examiner

*Primary Examiner*—Hong Kim

(57) ABSTRACT

A storage system includes a storage medium containing blocks identified by block addresses. The storage medium stores hierarchical data structures, each hierarchical data structure containing plural levels of data objects. Each hierarchical data structure is stored in a respective group of blocks. In response to a request containing an identifier of at least one of the hierarchical data structures, a controller generates one or more block addresses based on the identifier. The controller accesses one or more blocks indicated by the one or more block addresses.

20 Claims, 3 Drawing Sheets

GENERATING ONE OR MORE BLOCK ADDRESSES BASED ON AN IDENTIFIER OF A HIERARCHICAL DATA STRUCTURE

BACKGROUND

In modern computer systems, storage devices are used to store data and program instructions. Examples of storage devices include integrated circuit (IC) storage devices (such as dynamic or static random access memories, flash memories, and electrically erasable and programmable read-only memories), hard disk drives, floppy disk drives, optical drives, and other types of storage devices.

The storage medium of certain types of storage devices are partitioned into predefined blocks for storing data. Such storage devices are referred to as "blocked storage devices." In one example, the blocks of a disk-based storage device include sectors. The blocks of a storage medium are addressed by physical block addresses, which are usually mapped to logical block addresses for use in a host computer. In response to a request (read or write) from an application program, the file system in a host computer generates commands (read or write commands) containing logical block addresses. The read or write commands are sent by the file system through a storage device adapter in the host computer to a device controller in the storage device. The device controller performs the appropriate conversion of the logical block addresses to physical block addresses, which are then used to access corresponding blocks in the storage device.

Most files generated by a host computer system are too large to be stored within a single block of a storage device. Examples of such files include files containing formatted documents, files containing audio data, files containing video data, files containing multimedia data, and so forth. Large files are fragmented for storing in multiple blocks in the blocked storage device. Once fragmented into blocks, the characteristic of the original file (formatted document file, video file, audio file, and so forth) is lost. From the perspective of the storage device, each block of data is just a collection of bits, with the storage device unable to recognize whether such bits are part of a formatted document file, video file, audio file, or others. Such an arrangement reduces the features and flexibility of conventional storage devices.

DETAILED DESCRIPTION

Figure 1:
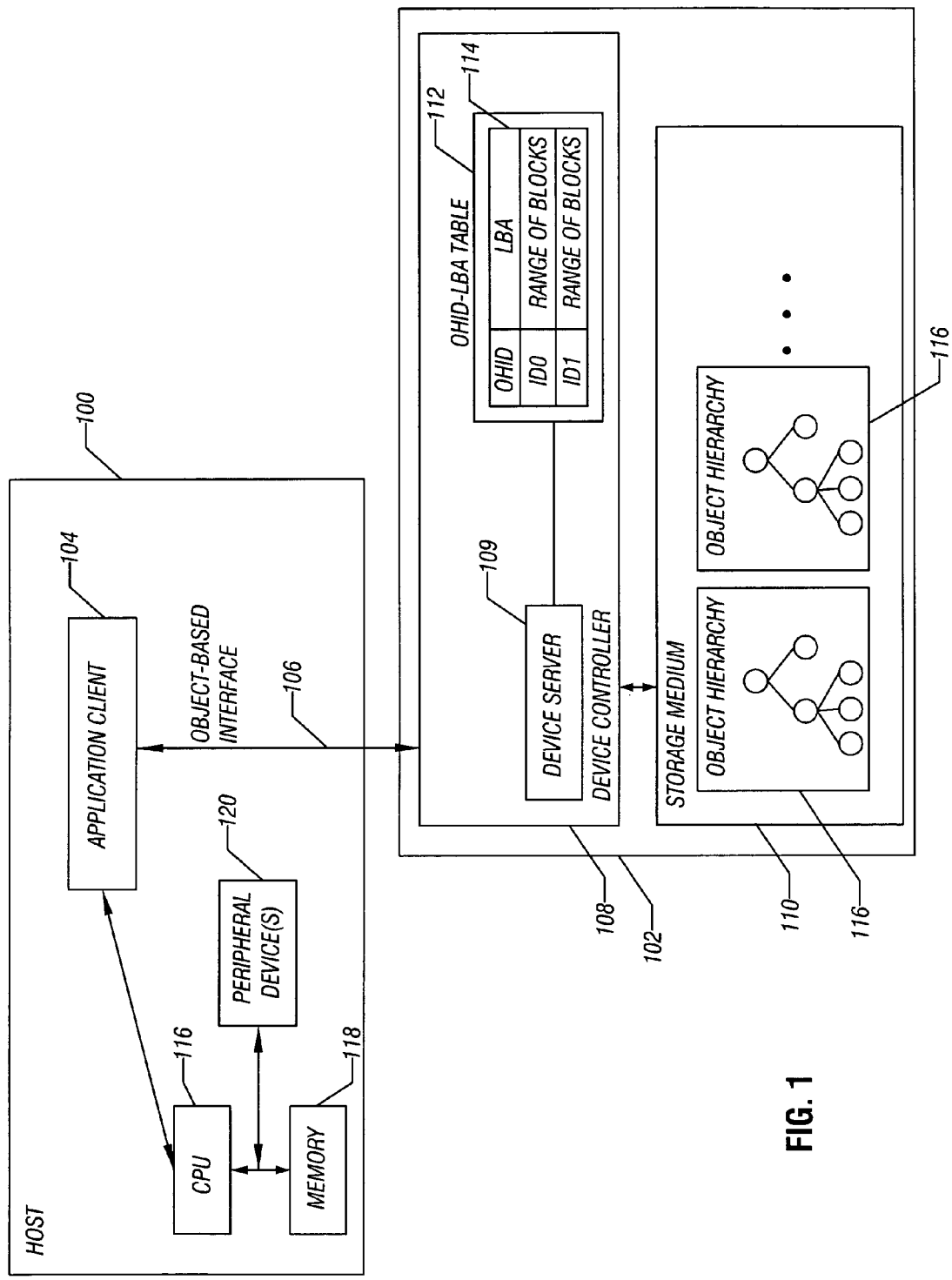
FIG. 1 is a block diagram of an example arrangement of a computer system.

FIG. 1 illustrates an example computer system that includes a host system 100 and a storage system 102. The host system 100 includes an application client 104 (as well as other software modules, not shown) that are executable on a central processing unit (CPU) 116. The CPU 116 is coupled to a memory 118 and peripheral devices 120.

The storage system 102 can be part of the host system 100, or the storage system 102 can be attached or coupled to the host system 100 through a link (e.g., a port, network, and so forth). The application client 104 in the host system 100 accesses the storage system 102 through an object-based interface 106, which includes several layers of components. The number of layers of components of the object-based interface 106 is less than the number of layers found in conventional interfaces to storage systems. Conventional interfaces typically include the following layers: file system, device driver, port adapter, and device controller. A request (generated by an application program in a host system) for data in a storage system has to be processed by each of the layers of such conventional interface, which typically translate addresses from one format to another (e.g., translation of file identifiers to logical block addresses, and translation of logical block addresses to physical block addresses). Such processing of access requests is costly in terms of consumed system resources and increased processing time.

In accordance with some embodiments of the invention, the object-based interface 106 employs a smaller number of layers of components, which perform less processing of access requests for data in the storage system 102. The object-based interface 106 allows the application client 104 to send object-based requests (read requests, write requests, and other requests) to a device controller 108 in the storage system 102. Each object-based request causes the device controller to perform an access of data objects stored in the storage system 102. The arrangement of FIG. 1 depicts a client-server model, in which requests from the application client 104 are processed by a device server 109 in the device controller 108.

The storage system 102 recognizes data at the object level so that the object-based requests from the application client 104 do not have to be converted by the host system 100 to read or write commands that specify block addresses for identifying blocks of the storage system 102. As a result, the processing of access requests in the host system 100 is reduced to enhance host system computation efficiency.

The object-based data structure employed by the storage system 102 for storing data is a hierarchical data structure that has multiple levels of data objects. The data objects of each hierarchical data structure (also referred to as an "object hierarchy") are related by some common characteristic (e.g., formatted document data, music data, video data, and so forth). Multiple object hierarchies 116 are stored in the storage medium 110 to represent different groups of data. Each data object of an object hierarchy 116 represents one of a directory, a file, or other data structure. As shown in FIG. 1, plural object hierarchies 116 are stored in a storage medium 110 of the storage system 102. As used here, the term "storage medium" refers to one or plural storage elements, such as integrated circuit storage devices, disk-based magnetic or optical storage devices, and others. The storage medium 110 is partitioned into blocks that are identified by logical block addresses. Each object hierarchy 116 is stored in a respective set of blocks.

To access an object hierarchy, an object-based request specifies a unique object-hierarchy identifier (OHID) that is associated with the object hierarchy 116. The OHID included in the object-based request is not translated by the object-based interface 106 in the host system 100 to block addresses associated with blocks of the storage medium 110. Instead, the translation between OHID and block addresses is performed by the device server 109 in the device controller 108. The device server 109 can be firmware or software executable on a processing core of the device controller 108. The processing core can be in the form of a microcontroller, processor, and so forth.

The device controller 108 also includes a memory 112 that stores an OHID-LBA (logical block address) table 114. The OHID-LBA table 114 is a conversion table to enable translation between an OHID and a range (or other group) of logical block addresses corresponding to the OHID. In the example shown in FIG. 1, the first row of the table 114 includes an OHID having value ID0, which is associated with a range of logical block addresses that identify the blocks containing the object hierarchy identified by ID0. Similarly, the second row of the table 114 contains an OHID of value ID1, which is associated with another range of logical block addresses to represent the storage locations in the storage medium 110 that contain the object hierarchy identified by ID1. In other embodiments, OHIDs are translated to physical block addresses instead of logical block addresses. More generally, OHIDs are translated to some group of one or more addresses to identify blocks of the storage medium 110.

In one implementation, the memory 112 for storing the OHID-LBA table 114 is part of the device controller 108. The memory 112 can be a non-volatile memory (such as flash memory or electrically erasable and programmable read-only memory), dynamic memory (such as dynamic random access random memory, static random access memory, and so forth), or any other type of storage device. Alternatively, the memory 112 can be a predefined region of the storage medium 110 that is separate from the device controller 108.

The object-based interface 106 according to one implementation includes an operating system and a host adapter to enable communication between software modules (e.g., the application client 104) in the host system 100 and the device controller 108 in the storage system 102. Alternatively, the device controller 108 can be part of the host system 100 such that the host adapter can be omitted. By performing the OHID-to-logical block address (and vice versa) translation at the device controller 108, host system resources such as the CPU 116 do not have to be allocated to perform storage access processing. Another benefit offered by storing data in the object hierarchies is that characteristics of data stored in the storage system 102 are maintained. For example, the storage system 102 is aware of the type of data contained in each object hierarchy 116, such as whether the object hierarchy 116 contains music data, video data, formatted document data, or other type of data.

In addition, attributes and functions can be associated with each object hierarchy 116 as well as with each data object in the object hierarchy. Attributes include information that describes features associated with a data object in the object hierarchy 116. For example, if a data object contains a music file, the attributes associated with data object can identify the author of the music file, the date the music file was released, and other information that may be of interest. Functions include any executable software routines or modules that are invocable (can be invoked) to perform specific tasks in response to a data access. For example, if a given data object contains a movie file, then the associated functions may include a routine to play the movie, a routine to rewind the movie, and a routine to fast forward the movie. The functions are invoked to perform the desired tasks. By associating attributes and functions with each data object, flexibility in the storage, access, and manipulation of data is enhanced.

Figure 2:
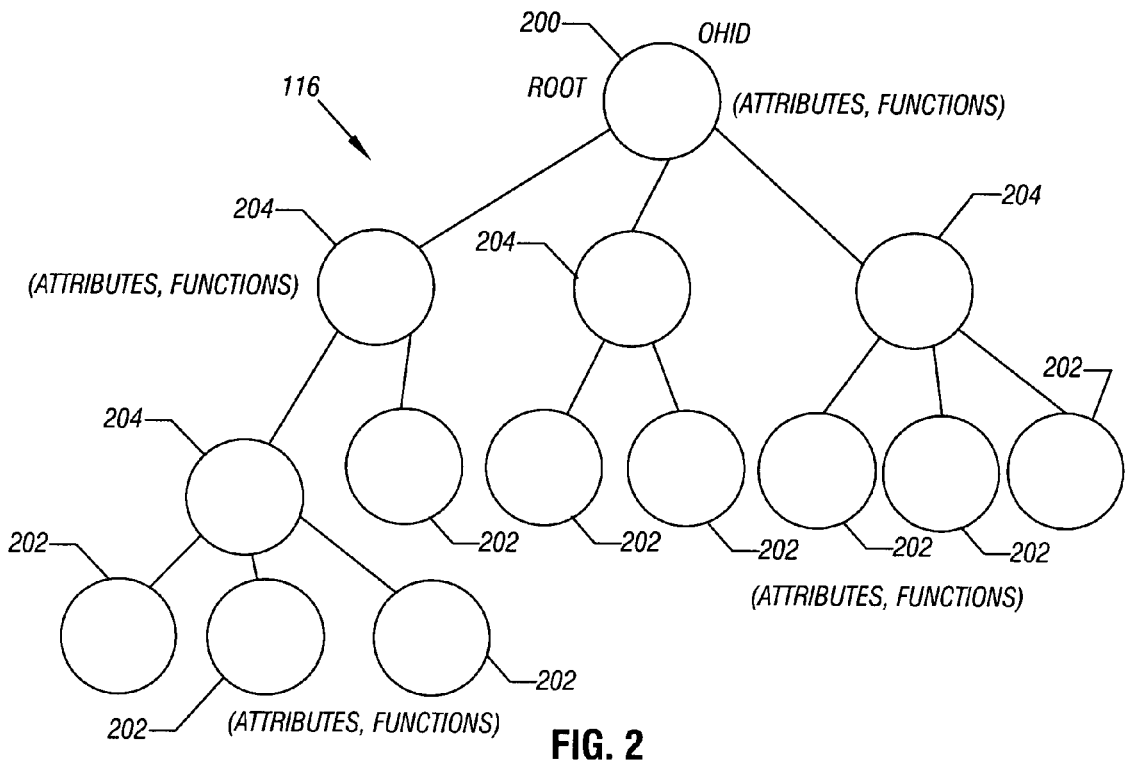
FIGS. 2 and 3 are schematic diagrams of object-based hierarchical data structures, according to some embodiments.

FIG. 2 shows an example object hierarchy 116 that can be stored in the storage 110 of FIG. 1. The object hierarchy 116 includes a root data object 200, which is associated with an OHID. The OHID contained in an access request from the application client 104 refers to the root data object 200 of the object hierarchy 116. The root data object 200 is at the highest level of the object hierarchy 116. The object hierarchy 116 can further include one or plural additional levels of data objects. The object hierarchy in the example shown in FIG. 2 includes three additional levels of data objects. The data objects to which lower level data objects are not attached are referred to as leaf data objects 202. Leaf data objects 202 are coupled by intermediate data objects 204 to the root data object 200. As shown in the example of FIG. 2, attributes and functions are also associated with at least some of the data objects 200, 202, and 204.

Figure 3:
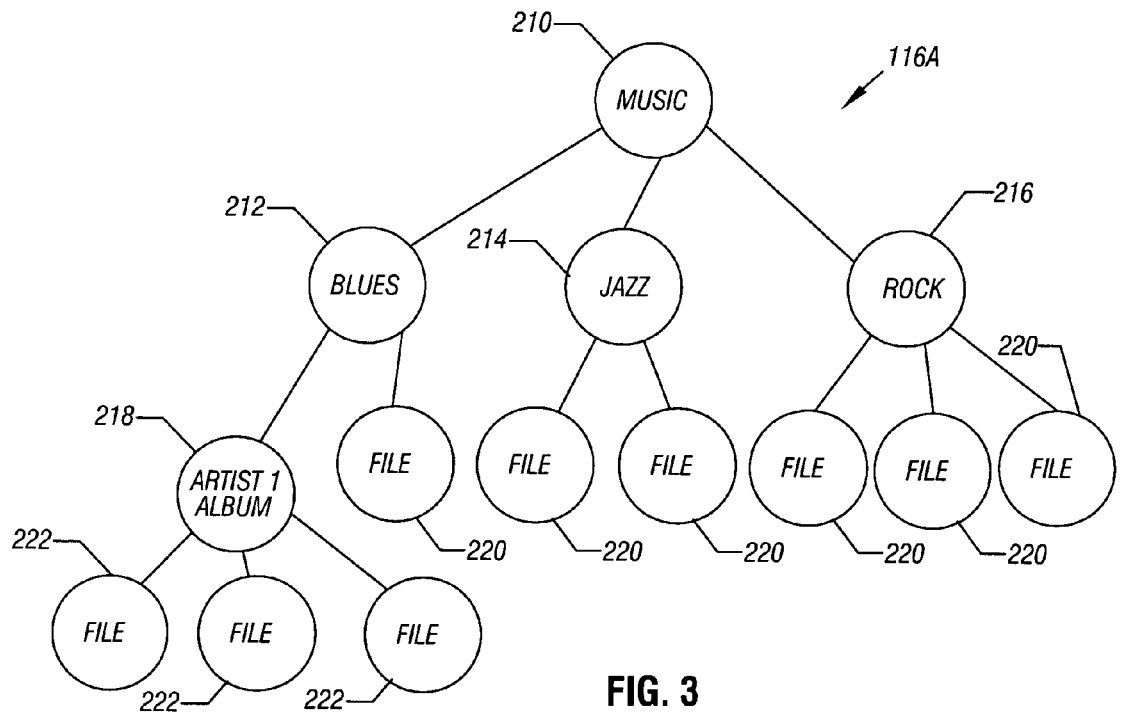

FIG. 3 shows a more specific example of an object hierarchy 116A, which contains a root data object 210 that indicates that the data stored in the object hierarchy 116A is music data. The object hierarchy 116A includes the following intermediate data objects: data object 212 to indicate storage of blues music, data object 214 to indicate storage of jazz music, and data object 216 to indicate storage of a rock music. The intermediate data objects 212, 214, and 216 are analogous to directories. The leaf data objects 220 in the object hierarchy 116A contain the actual music files associated with each category of music (blues, jazz, and rock). In addition, another intermediate data object 218 is present in the object hierarchy 116A. The data object 218 is connected below the blues data object 212. The data object 218 represents an album that is associated with a particular artist. Coupled to the album data object 218 are leaf data objects 222 containing the music files of that particular album.

Figure 4:
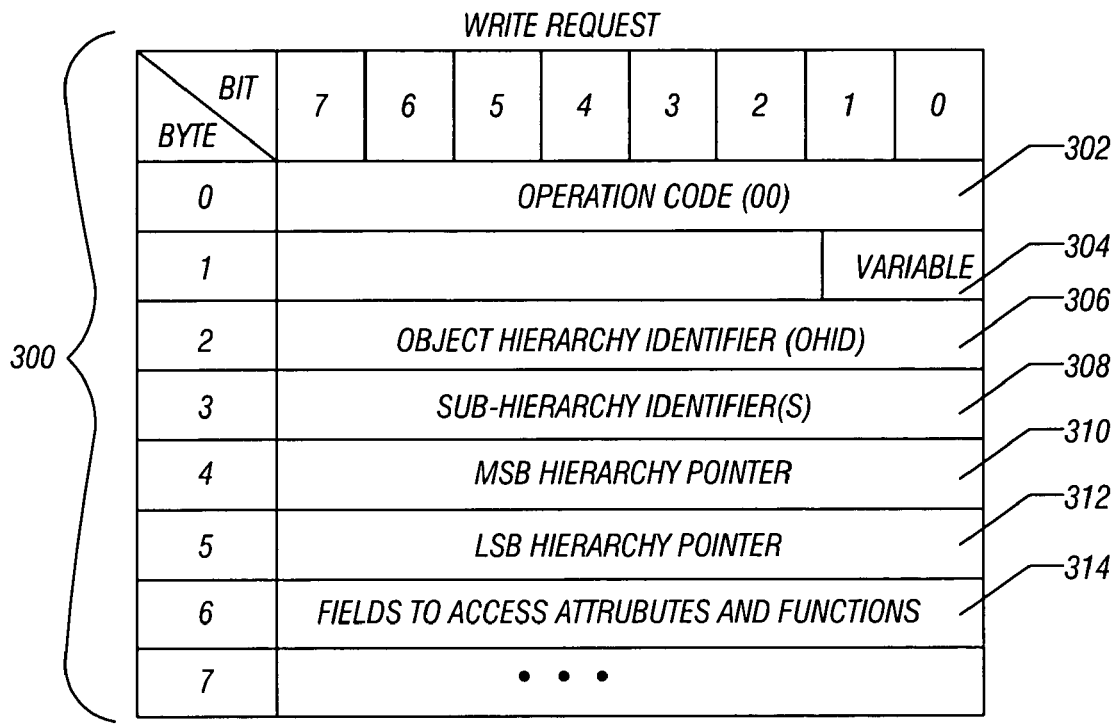
FIGS. 4 and 5 illustrate write and read commands, respectively, according to some embodiments of the invention for accessing (writing or reading) the object-based hierarchical data structures of FIGS. 2 and 3.
Figure 5:
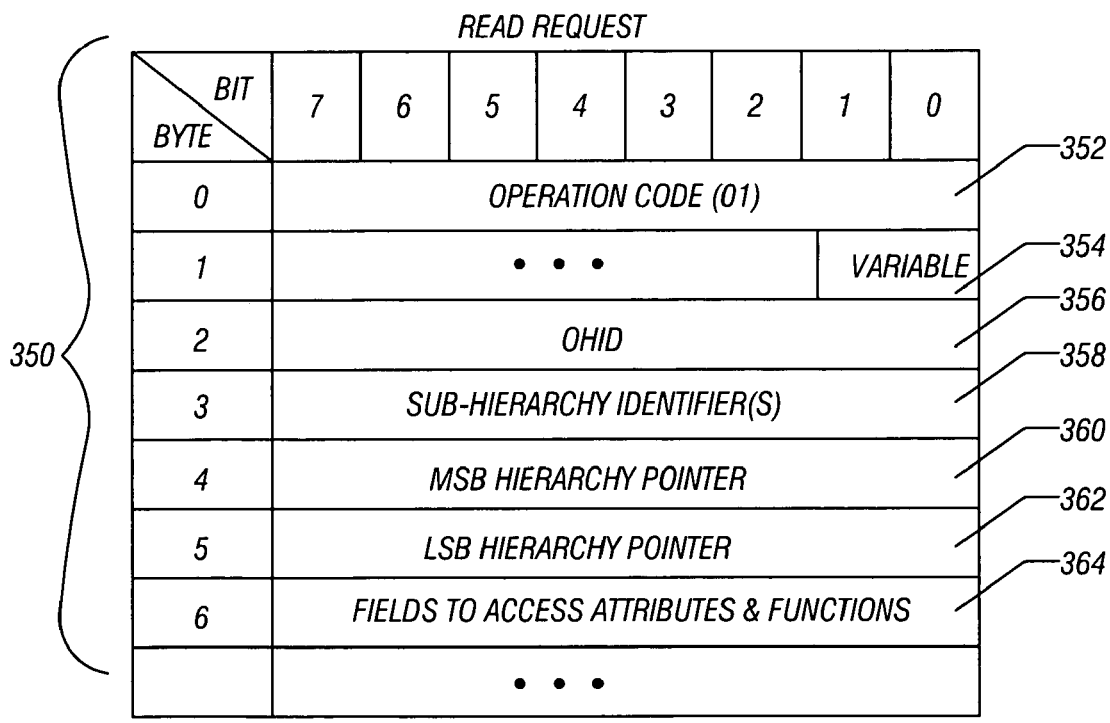

FIGS. 4 and 5 illustrate example formats of a write request 300 and a read request 350, respectively, that are used for accessing object hierarchies 116 stored in the storage system 102. The specific formats of the write and read requests are provided as examples. In other implementations, the write and read requests have other formats.

The write request 300 includes multiple bytes of information, including an operation code (having hexadecimal value 00 or some other predetermined value to indicate a write). A variable indicator 304 indicates that the length of the write request is variable. An OHID field 306 contains the object hierarchy identifier of the object hierarchy that is to be accessed by the write request to perform the write. A sub-hierarchy identifier (SOHID) 308 more specifically identifies a data object in the object hierarchy 116. The SOHID 308 identifies one of the data objects in the object hierarchy 116. More than one SOHID can be specified in the write request.

In one embodiment, the object hierarchy 116 has a fixed hierarchy, where the depth (number of levels) and breadth (number of data objects at each level) are fixed. With a fixed hierarchy, a matrix can be used to identify selected data objects in the hierarchy. Each location in the matrix (which is the SOHID) corresponds to a specific data object. Selection of a data object is performed by setting the value of the matrix location to a given value (such as a binary "1" value).

In another implementation, the object hierarchy 116 is a dynamic hierarchy, where the depth and breadth are not predefined but rather can vary. With the dynamic hierarchy, a linked list of SOHIDs is used to identify corresponding data objects. In response to receiving a write request containing an OHID and an SOHID, the device server 109 (FIG. 1) traverses the linked list corresponding to the OHID to find the specified SOHID and the data object corresponding to the SOHID.

The write request 300 also includes a most significant byte (MSB) hierarchy pointer 310 and a least significant byte (LSB) hierarchy pointer 312. The hierarchy pointers are effectively offsets to point to the particular portion within a data object to which the write is to be performed. The write request 300 also includes fields 314 to access attributes and functions associated with the data objects. The remaining fields of the write request 300 include the data to be written to the portion pointed to by the MSB hierarchy pointer 310 and the LSB hierarchy pointer 312.

The read request 350 shown in FIG. 5 includes an operation code 352, which in this case has the hexadecimal value 01, or some other predefined value, to indicate a read. A variable indicator 354 indicates that the read request 350 has a variable length, and an OHID field 356 indicates the object hierarchy targeted by the read request.

The read request 350 also includes a field 358 containing one or plural sub-hierarchy identifier(s) to identify the data object(s) to read from in the target object hierarchy. The MSB and LSB hierarchy pointers in fields 360 and 362, respectively, specify the pointer(s) of portions of the selected data object(s) that are to be retrieved. Optionally, an entire data object may be retrieved (instead of just a portion of the data object), in which case the MSB and LSB hierarchy pointer can be omitted. The read request also includes fields 364 to enable access of attributes and functions associated with the data objects of an object hierarchy.

In addition to the write request and read request referred to above, other requests can also be issued by the application client 104 (FIG. 1). One such other request is an inquiry request that is submitted to the device server 109 to retrieve predetermined information associated with each object hierarchy. For example, the inquiry request can cause retrieval of the sub-hierarchy identifier information, such as the matrix and linked list referred to above.

As noted above, the device server 109 (FIG. 1) can be implemented in firmware or software, or the combination of firmware and software. The software or firmware is executed on a control unit or processor in the storage system 102 (FIG. 1). The control unit or processor includes a microprocessor, microcontroller, processor module or subsystem (including one or more microprocessors or microcontrollers), or other control or computing devices. As used here, a "controller" refers to hardware, firmware, software, or a combination thereof. A "controller" can refer to a single component or to plural components (whether software, firmware, or hardware).

Data and instructions (of the software or firmware) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage system comprising:
    a storage medium containing blocks identified by block addresses, the storage medium to store data in hierarchical data structures, each hierarchical data structure containing plural levels of data objects, and each hierarchical data structure stored in a respective group of the blocks;
    a storage location to store a table having plural entries, each of the plural entries mapping a corresponding identifier of a hierarchical data structure to a respective range of block addresses; and
    a controller to:
        in response to a request containing an identifier of at least one of the hierarchical data structures, generate one or more block addresses based on the identifier in the request by accessing the table; and
        access one or more blocks indicated by the one or more block addresses.

2. The storage system of claim 1, wherein each hierarchical data structure includes at least one leaf object, a root object, and at least one intermediate object coupled between the leaf object and the root object.

3. The storage system of claim 1, wherein the storage location is part of the controller.

4. The storage system of claim 1, wherein the storage location is part of the storage medium.

5. The storage system of claim 1, wherein the request comprises one of a read and write request.

6. The storage system of claim 1, wherein the request comprises another identifier to identify one of the data objects in the hierarchical data structure.

7. The storage system of claim 6, wherein the request comprises one or plural pointers to point to one or more locations within the data object identified by the another identifier.

8. The storage system of claim 1, wherein each hierarchical data structure comprises data objects sharing a common characteristic.

9. The storage system of claim 8, wherein each hierarchical data structure comprises a root data object and additional data objects at lower levels of the hierarchical data object.

10. The storage system of claim 1, wherein at least one of the data objects is associated with a function invocable by the request to perform a predefined task.

11. The storage system of claim 10, wherein at least one of the data objects is associated with an attribute accessible by the request.

12. The storage system of claim 1, wherein at least some of the data objects are associated with respective functions invocable by one or more requests to perform predefined tasks.

13. The storage system of claim 12, wherein the at least some of the data objects are associated with attributes defining characteristics of respective data objects.

14. A method of accessing data, comprising:
    storing, by a storage system, data in hierarchical data structures, each hierarchical data structure containing plural levels of data objects;
    storing a table of identifiers mapped to corresponding ranges of block addresses in the storage system;

receiving, at the storage system from a host system, a request containing an identifier of one of the hierarchical data structures; and converting, based on accessing the table by the storage system, the identifier in the request to one or more block addresses to specify corresponding blocks in a storage medium, wherein receiving the request comprises receiving the request in which the identifier is not translated by the host system.

15. The method of claim 14, wherein receiving the request comprises receiving the request that further includes another identifier to identify one of the data objects in the one hierarchical data structure.

16. An article comprising at least one computer-readable storage medium containing instructions that when executed by a processor cause a storage system to:

store data in hierarchical data structures, each hierarchical data structure containing plural levels of data objects, and each hierarchical data structure stored in a respective group of blocks of a storage medium in the storage system;

store a table of identifiers mapped to corresponding ranges of block addresses in the storage system;

receive, from a host system, a request containing an identifier of one of the hierarchical data structures, wherein the identifier in the request is not translated by the host system; and convert, by accessing the table, the identifier in the request to one or more block addresses to specify corresponding blocks in the storage medium of the storage system.

17. The article claim 16, wherein the instructions when executed cause the storage system to further store functions associated with data objects of the hierarchical data structure, each function to perform a predefined task on a respective data object.

18. The article of claim 17, wherein the instructions when executed cause the storage system to further:

receive a second request; and invoke at least one function associated with at least one of the data objects in response to the second request.

19. The article of claim 18, wherein the instructions when executed cause the storage system to further:

store attributes associated with the data objects;

receive a third request; and access attributes associated with at least one of the data objects in response to the third request.

20. The article of claim 16, wherein receiving the request comprises receiving a request containing a second identifier to identify one of the data objects in the one hierarchical data structure.

* * * * *